United States Patent [19]

Seeds

[11] Patent Number: 5,672,286
[45] Date of Patent: Sep. 30, 1997

[54] METHOD OF WELDING ALUMINUM DRIVE SHAFT COMPONENTS

[76] Inventor: Harold W. Seeds, 2110 Chevy Chase Blvd., Kalamazoo, Mich. 49008

[21] Appl. No.: 692,414

[22] Filed: Aug. 5, 1996

Related U.S. Application Data

[60] Provisional application No. 60/003,922, Sep. 18, 1995.
[51] Int. Cl.$^6$ ........................................ B23K 9/09
[52] U.S. Cl. ............ 219/137 PS; 219/61; 219/137 WM
[58] Field of Search ................... 219/137 PS, 125.11, 219/137 R, 137 WM, 60 A, 61

[56] References Cited

U.S. PATENT DOCUMENTS

| | | | |
|---|---|---|---|
| 2,251,324 | 8/1941 | Carlson | 219/60 A |
| 4,542,280 | 9/1985 | Simons | 219/137 R |
| 4,912,299 | 3/1990 | Oros et al. | 219/137 PS |
| 4,986,002 | 1/1991 | Oros et al. | 33/354 |

Primary Examiner—Clifford C. Shaw
Attorney, Agent, or Firm—Reising Ethington Barnard & Perry

[57] ABSTRACT

A drive shaft assembly includes an aluminum torque tube and aluminum yokes that are arc welded to the ends of the torque tube. The torque tube has a hollow cylindrical end portion at each end that is pressed onto an annular end portion of the respective yoke to form a narrow annular slit. The two parts are then arc welded together by forming an electric arc between the parts at the narrow annular slit and a consumable aluminum based electrode. The electric arc is sustained with a pulsed high amperage direct current to fill the narrow annular slit with aluminum based material from the consumable electrode in a single pass.

15 Claims, 3 Drawing Sheets

METHOD OF WELDING ALUMINUM DRIVE SHAFT COMPONENTS

This application claims benefit of the filing date of and right of priority of United States Provisional Application 60/003,922 filed Sep. 18, 1995 under 35 USC §119(e).

BACKGROUND OF THE INVENTION

This invention relates generally to drive shaft assemblies for automotive vehicles and more particularly to a method of welding aluminum drive shaft components.

The use of aluminum and aluminum alloy components in place of steel components in automobiles is becoming increasingly popular because a substantial weight reduction can be realized without any sacrifice in strength or durability. Moreover aluminum components are more corrosion resistant than their steel counterparts. However, aluminum driveshaft components are generally more difficult to weld than the steel components that are replaced.

U.S. Pat. No. 4,542,280 granted to Samuel Simons Sep. 17, 1985 discloses a method for welding aluminum drive shaft components using gas metal arc welding commonly referred to as MIG welding. In the Simons method an aluminum torque tube is press fit on an end portion of an aluminum yoke forming a butt joint characterized by a wide annular gap. The aluminum torque tube is then arc welded to the yoke by filling the wide annular gap with a welding compound from a conventional arc welder. The weld is completed through two full revolutions of the aluminum torque tube and yoke. Two passes are used to reduce the magnitude of the welding current.

A major disadvantage of the Simons method is the requirement for two passes which results in a relatively slow speed of the welding operation. This relatively slow speed is simply not compatible with the high volume requirements of automotive welding.

Another disadvantage is that the use of a conventional arc welder results in relatively poor metallurgical properties of the aluminum torque tube and yoke in the vicinity of the weld even at low welding current levels because considerable heat is put into the two parts during the two passes.

U.S. Pat. No. 4,912,299 granted to Alvin K. Oros and Paul D. DeJager Mar. 27, 1990 purports to provide an improved technique for gas metal arc welding, i.e. MIG welding aluminum drive shaft components by a three step process. In this Oros/DeJager MIG process, the aluminum torque tube is press fit on the end portion of the aluminum yoke forming a gapless square-butt joint. An electrical direct current arc is then established between a positive consumable aluminum-based electrode and the two part assembly at the gapless square-butt joint as cathode. The arc is shrouded in shielding gas consisting by volume of 2–5% oxygen with the remainder inert gas and the current to the arc is pulsed at a frequency of 40–60 cycles per second while maintaining a current of at least 180 amps. The electric arc is then held in a predetermined orientation to the gapless square-butt joint and moved along the joint in a single pass at a relative speed of at least 60 inches per minute. This method purportedly eliminates the wide annular gap and multiple pass requirements of the Simons method discussed above and results in a faster welding operation and higher quality weld. However, while the Oros/DeJager method may have the claimed advantages in comparison to the Simons method, it also has its own disadvantages. Namely, the Oros/DeJager method requires use of an exotic shielding gas and a sophisticated orientation of the consumable electrode during the welding process. Another disadvantage is excessive heat is required to obtain fusion in the root of the joint, resulting in detrimental metallurgical properties.

SUMMARY OF THE INVENTION

The object of this invention is to provide a method for arc welding aluminum drive shaft components together in a single pass using a conventional inert shielding gas.

A feature of the invention is that an aluminum torque tube is press fit on an end portion of an aluminum yoke to form a narrow slit that can be filled with weld material in a single pass to form a strong torque resistant weld connection between the two parts.

Another feature of the invention is that an aluminum torque tube is arc welded to an aluminum yoke quickly using a pulsed, high amperage direct current to sustain the arc and conventional inert gasses to shield the arc.

Still another feature of the invention is that an aluminum torque tube and an aluminum yoke have cooperating portions that are shaped to form a narrow annular slit to facilitate arc welding the parts to each other.

In one embodiment of the invention, the aluminum torque tube has a curved end face that facilitates assembling the aluminum torque tube to the aluminum yoke and arc welding the parts to each other.

In another embodiment of the invention, the aluminum torque has a three part end face that facilitates assembling the aluminum torque tube to the aluminum yoke and arc welding the parts to each other.

In yet another embodiment of the invention, the aluminum yoke has a conical face that facilitates arc welding the parts to each other.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
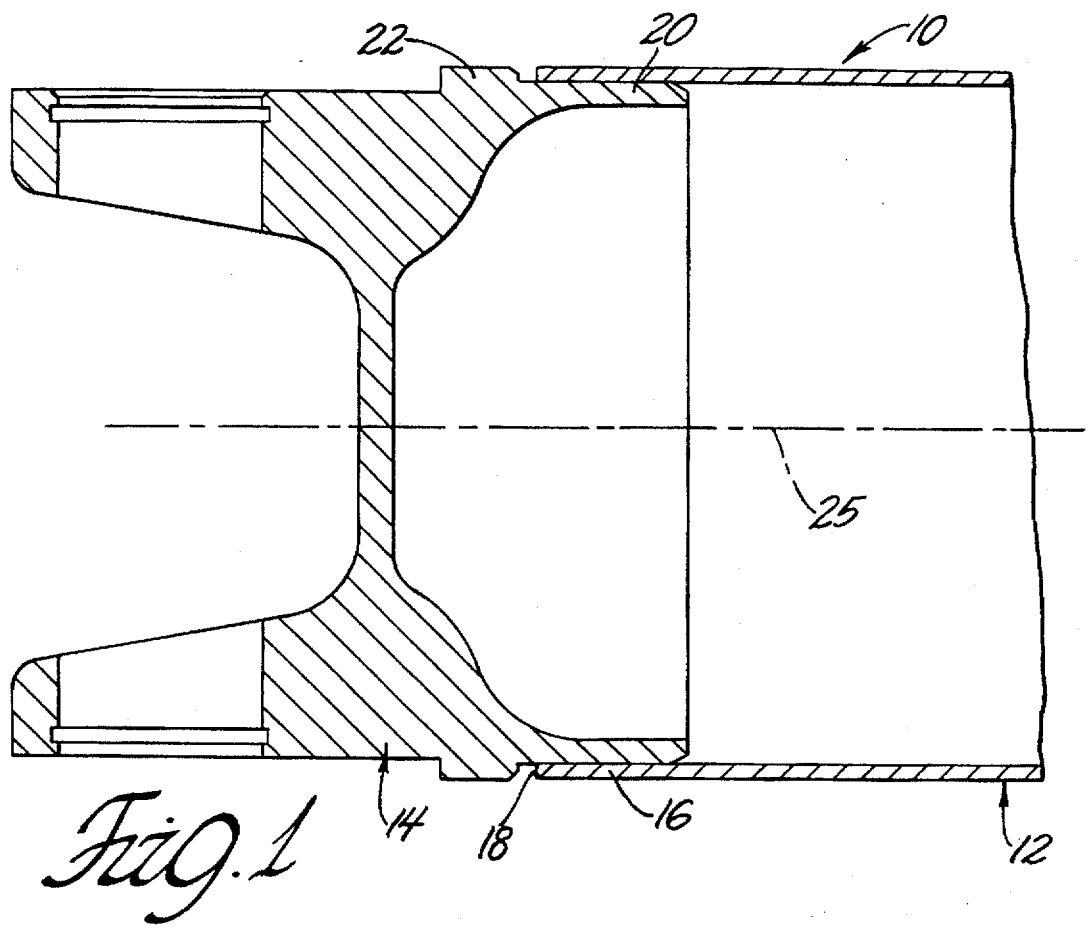
FIG. 1 is a partially sectioned longitudinal view of a drive shaft assembly having aluminum components positioned for being arc welded together in accordance with the invention.

Referring now to the drawing, a drive shaft assembly 10 comprises a tubular drive shaft or torque tube 12 having yokes 14 at each end for installing the drive shaft assembly 10 in a motor vehicle. Both yokes 14 are attached to the torque tube 12 in an identical manner, and thus only one yoke 14 and its attachment to the torque tube 12 is shown in the drawing and described in detail below.

The tubular drive shaft 12 is made of aluminum, aluminum alloy or other aluminum based material such as an aluminum metal matrix comprising an aluminum oxide in an aluminum alloy matrix. Such a torque tube is hereinafter referred to simply as an "aluminum" torque tube. These aluminum torque tubes enjoy a weight and stiffness advantage and other known advantages over their steel counterparts.

The yoke 14 is also made of "aluminum", that is the yoke 14 is made of aluminum, aluminum alloy or other aluminum based material such as an aluminum metal matrix comprising an aluminum oxide in an aluminum alloy matrix. These aluminum yokes also enjoy a weight and stiffness advantage and other known advantages over their steel counterparts.

While these aluminum drive shaft components both enjoy weight and other advantages over their steel counterparts, it has long been recognized that these aluminum components cannot be welded to each other as easily as their steel counterparts. However, I have discovered a unique and efficient method for gas metal arc welding, or MIG welding aluminum driveshaft components to each other that is quicker and/or more economical that the known methods discussed above. This method applies particularly to MIG welding an aluminum torque tube having a thickness in the range of 0.060 to 0.250 inches to an aluminum yoke which by nature is quite massive in comparison to the aluminum torque tube. Basically my method involves preparation of a specially configured narrow slit butt joint that is filled with aluminum weld material from a consumable electrode in a single pass using a pulsed high amperage direct current to sustain the welding arc.

This specially configured narrow slit butt joint is formed by cooperating ends of the torque tube 12 and the yoke 14. More specifically the torque tube 12 has a hollow cylindrical end portion 16 of uniform inner and outer diameter and uniform wall thickness. The end portion 16 terminates in a curved or convex annular end face 18.

On the other hand the yoke 14 has an annular end portion 20 of uniform outer diameter and a wall thickness that is substantially greater than the thickness of the end portion 16 of the torque tube 12. The wall thickness may vary as shown in the drawing but the outer surface of the end portion 20 is substantially cylindrical. The annular end portion 20 of the yoke 14 protrudes from a concentric collar portion 22 of the yoke 14 that has an outer diameter that is about the same as the outer diameter of the torque tube 12 at the end portion 16.

The collar portion 22 is shaped so that it includes a flat annular end face 24 that is perpendicular to the axis 25 of the drive shaft assembly 10. An annular fillet 26 provides a smooth concave junction from the flat annular end face 24 of the collar portion 22 to the outer cylindrical surface of the annular end portion 20 of the yoke 14. The collar portion 22 also has an outer chamfer or beveled edge 28 at the outer circumference of the flat annular end face 24.

Figure 2:
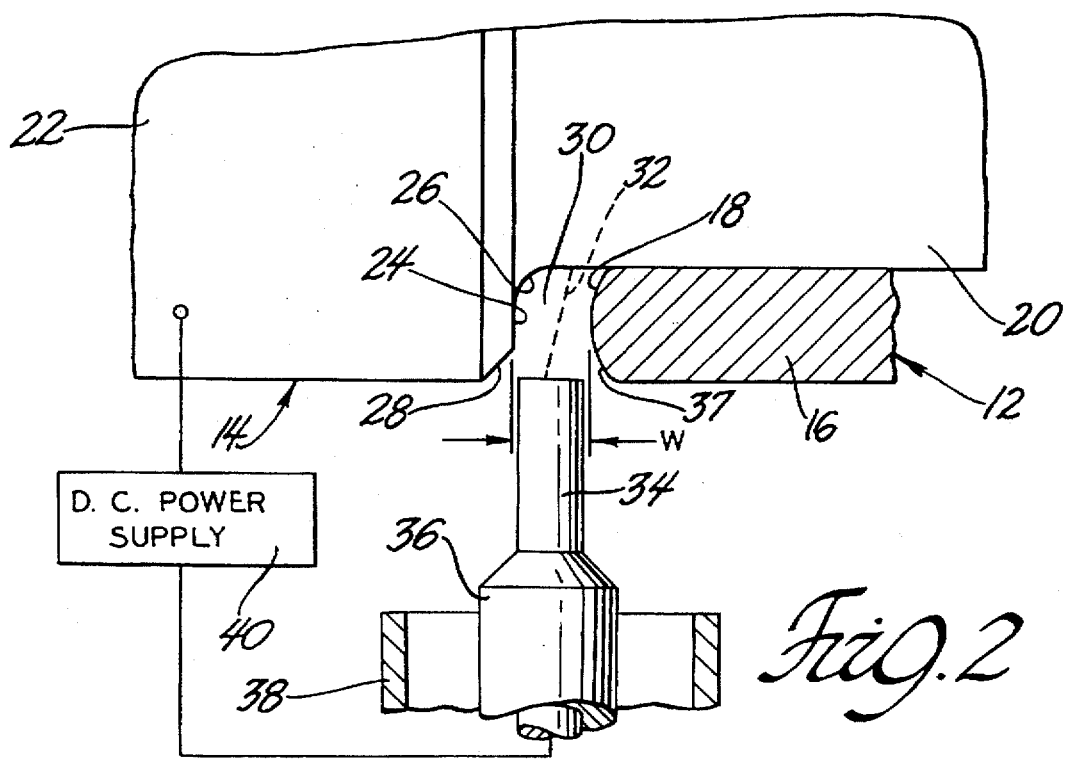
FIG. 2 is an enlarged fragmentary sectional view of the drive shaft assembly of FIG. 1 showing the aluminum components in the process of being arc welded together in accordance with the invention.

After the torque tube 12 and yoke 14 are shaped as described above, the hollow cylindrical end portion 16 of the torque tube 12 is press fit onto the annular end portion of the yoke 14 to form a butt joint characterized by a narrow annular slit 30 that exposes the outer cylindrical surface of the annular end portion 20 of the yoke 14 and the annular fillet 26 as best shown in FIG. 2.

This narrow annular slit 30 has a gaugeable width W between the curved end face 18 of the torque tube 12 and the flat end face 24 of the yoke 14 as indicated in FIG. 2. The gaugeable width W is the range of 0.045 to 0.055 inches. The width W is exaggerated in FIG. 2 in order to show surface details more clearly.

During the manufacturing process the annular slit 30 is set and/or checked by inserting a flat template (not shown) that has a thickness corresponding to the desired narrow width W between the curved end face 18 of the torque tube 12 and the flat end face 24 of the yoke 14. The curved end face 18 thus provides a gauge surface for controlling the welding process.

Moreover, the curved end face 18 also provides inner and outer chamfer-like or bevel-like surfaces at the end of the torque tube 12. The inner chamfer-like surface facilitates insertion of the annular end portion 20 of the yoke 14 into the hollow cylindrical end portion 16 of the torque tube 12, and also provides space that accommodates the volume of metal in the fillet 26 that may melt during the welding process. The outer chamfer-like or bevel like surface accommodates electrode misalignment as explained below.

After the torque tube 12 is press fit onto the yoke 14 to establish the narrow slit 30 as shown in FIG. 2, an arc 32 is established between a consumable aluminum based electrode 34 and the assembly comprising the torque tube 12 and yoke 14.

The electrode 34 is preferably aimed at the longitudinal axis of the assembly so that the centerline of the round wire forming the electrode bisects the width W of the narrow annular slit 30. However, the electrode 34 need not be aligned with the narrow slit 30 precisely because the outer chamfer-like end surface 37 of the torque tube 12 and the outer chamfer 28 of the yoke 14 accommodate a small misalignment in the longitudinal direction.

The electrode 34 is held and advanced by a torch 36 of an electric arc welder (not shown) that includes a shroud 38 for the torch 36 and a direct current power supply system 40. The direct current supply system 40 has the electrode 34 arranged as positive and aluminum components 12 and 14 arranged as the cathode or negative. The direct current supply is in the range of about 10 amps to 500 amps, with a frequency of about 30 to 300 cycles per second and voltage in the range of 10 to 40 volts.

Electrode 34 is preferably comprised of an aluminum based wire composition alloy 4043 or 5356, and configured as a round wire having an outer diameter which preferably matches the width W of the narrow slit 30 which is in the range of 0.045 to 0.055 inches. The yoke 14 is preferably comprised of aluminum 6061 T-6, and the torque tube 12 is preferably comprised of aluminum 6061 T-6. Electrode 34 is fed along the axis of welding torch 36 during the welding operation to maintain a desired distance of the electrode tip from the weld profile as the tip of the electrode 34 is being consumed.

A shielding gas mixture is directed to the region of the weld through the annular space between the welding torch 36 and the shroud 38. Commercially available welding grade inert gasses such as argon or helium or combinations of the two may be used as the shielding gas.

Welding is carried out at a frequency of 100 to 200 cycles per second while maintaining an average current of at least 100 amps. With this power setting the yoke 14 can be welded to the torque tube 12 in a single pass forming a continuous torque resistant weld bead 42 that fills the narrow annular slit 30 with weld metal from the consumable electrode 34. This weld bead 42 is preferably formed by rotating the assembly 10 with respect to the electrode 34. The weld bead 42 can be laid down at the rate of 40 to 60 inches per minute so that the method is much faster than that described in the Simons patent discussed above. Moreover, the welding method of this invention does not require multiple passes as in the Simons method because the annular slit 30 is much narrower that the wide annular gap of Simons method and the electric arc is maintained by a pulsed high amperage current.

Furthermore the method of this invention does not require exotic shielding gasses or sophisticated orientation of the consumable electrode 34 as is the case of the Oras/DeJager method described above which is due in part at least to the presence of the narrow annular slit 30.

Figure 4:
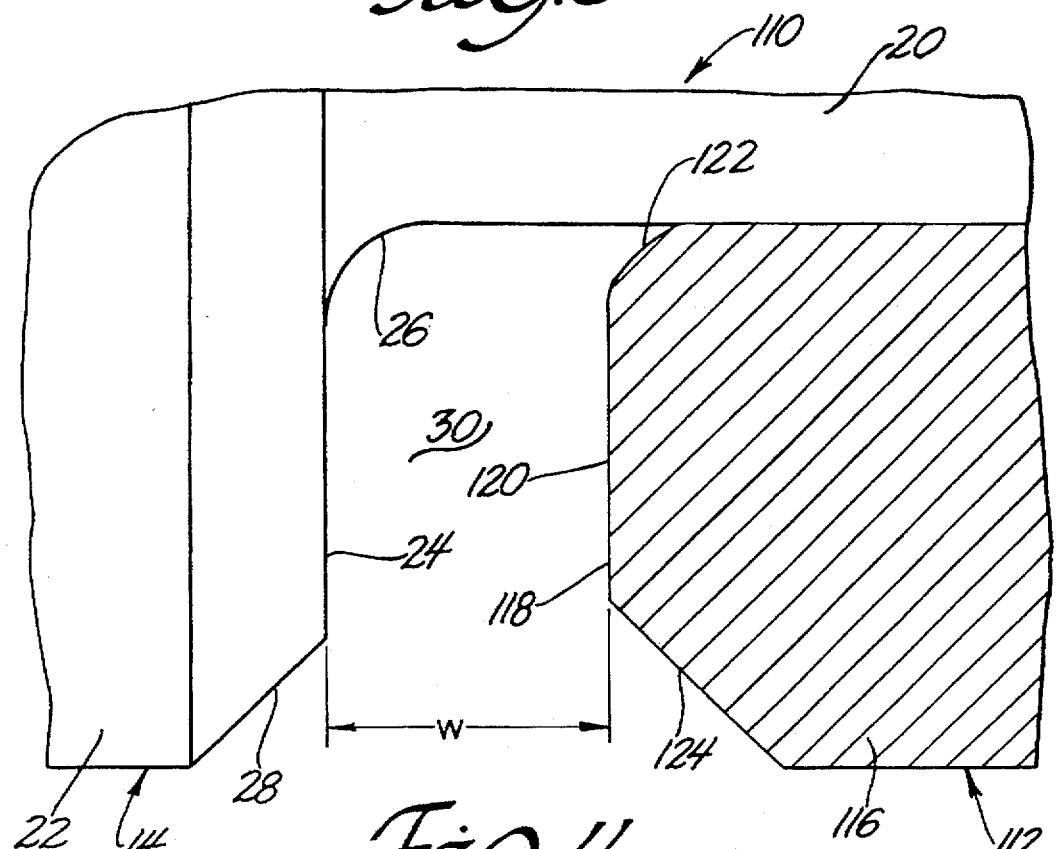
FIG. 4 is an enlarged fragmentary sectional view of another drive shaft assembly having aluminum components used in practicing the invention.

FIG. 4 shows another shaft assembly 110 that can be used to practice the invention. Drive shaft assembly 110 comprises an aluminum torque tube 112 and an aluminum yoke 14. Yoke 14 is identical to yoke 14 of drive shaft assembly 10 and corresponding parts are identified with the same numerals.

Figure 3:
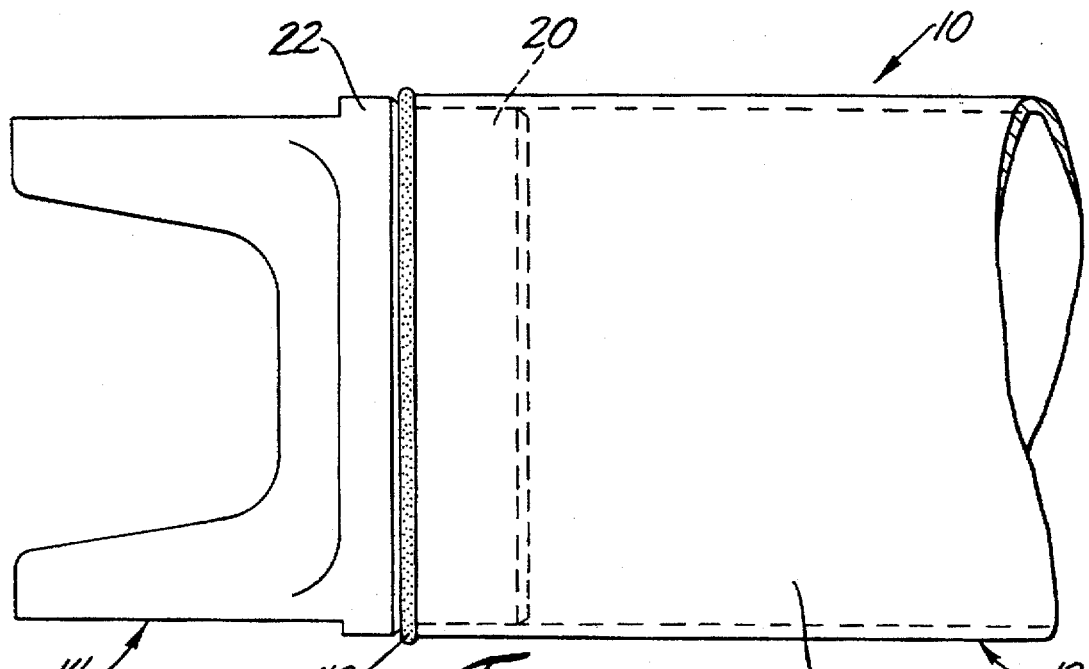
FIG. 3 is a longitudinal view of the drive shaft assembly of FIG. 1 showing the aluminum components attached to each other by a completed weld bead.

The torque tube 112 is the same size as the torque tube 12. The aluminum torque tube 112 also has a hollow cylindrical end portion 116 of uniform inner and outer diameprr and uniform wall thickness that is press fit on the yoke 14. However, the end portion 116 terminates in an annular end face 118 that has three parts—a flat mid section 120, an inner corner radius 122 and an outer chamfer 124. The narrow width W of the narrow annular slit 130 is now gauged by the distance between the flat end surface 24 of the yoke 14 and the midsection 120 of the annular end face 118 of the torque tube 112. The inner corner radius 122 facilitates insertion of the yoke end portion 20 and provides space for metal from fillet 26 during the welding process. Outer chamfer 124 together with the outer chamfer 28 of yoke 14 accommodates a small misalignment of the consumable electrode in the longitudinal direction so that the electrode 34 shown in FIG. 2 does not have to be precisely aligned with the slit 130 for the welding operation. Yoke 14 and torque tube 112 are welded together in the same manner as the drive assembly 10 shown in FIGS. 1, 2 and 3 by filling the narrow annular slit 130 with weld metal from the consumable electrode 34 in a single pass with an electric arc that is sustained with a pulsed high amperage direct current.

Figure 5:
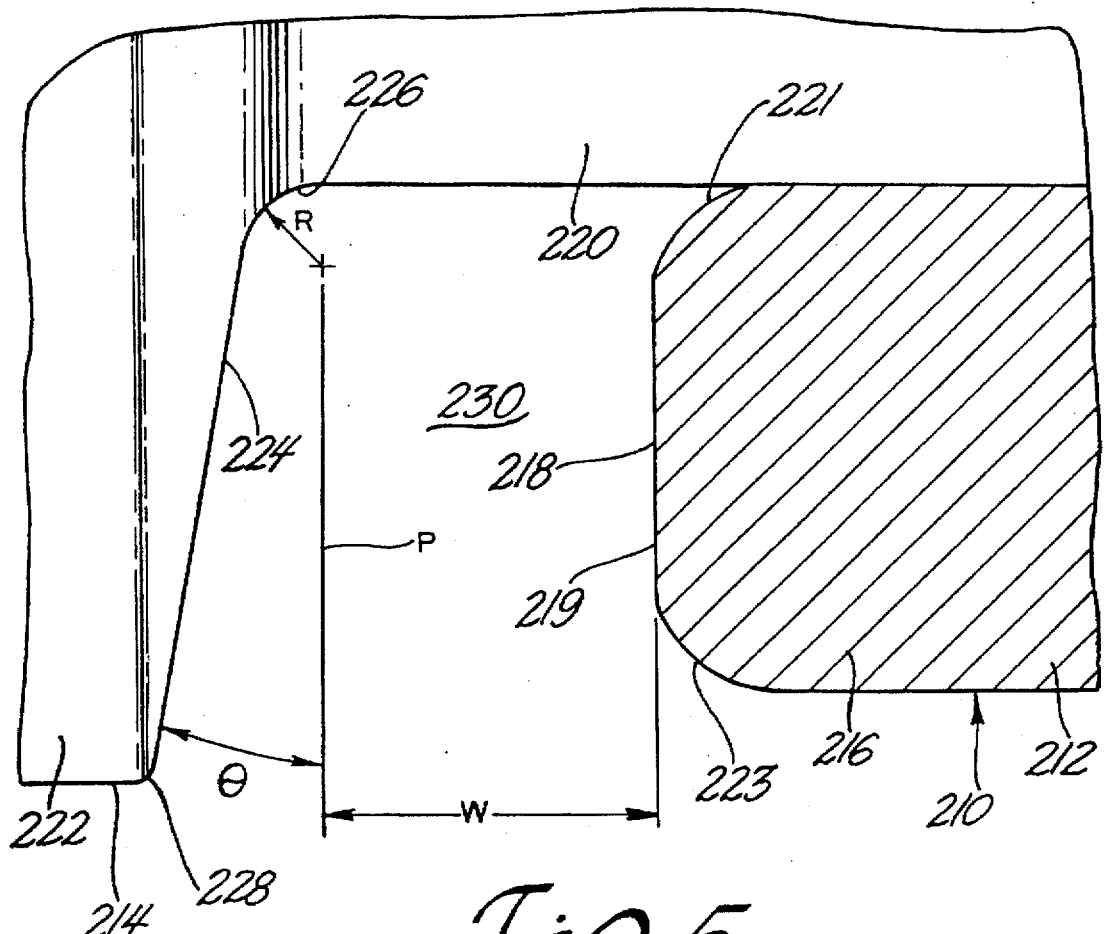
FIG. 5 is an enlarged fragmentary sectional view of still another drive assembly having aluminum components used in practicing the invention.

FIG. 5 shows still another drive shaft assembly 210 that can be used to practice the invention. Drive shaft assembly 210 comprises an aluminum yoke 214 and an aluminum torque tube 216 that provides a specially configured narrow annular slit butt joint for arc welding the two parts together.

The aluminum torque tube 212 is the same size as the aluminum torque tube 12 and also has a hollow cylindrical end portion 216 that is of uniform inner and outer diameter and uniform wall thickness. The end portion 216 terminates in an annular end face 218 that comprises a flat mid section 219, an inner corner radius 221 and an outer corner radius 223.

The yoke 214, like yoke 14, has an outer annular end portion 220 of uniform outer diameter and a variable wall thickness that is substantially greater than the thickness of the tube end portion 216. However, the yoke 214 has an annular collar portion 222 that is shaped so that it has a conical end face 224 that slants away from the end face 218 of the torque tube 212 in the radially outward direction. The conical end face 224 forms an angle θ with an imaginary plane P that is perpendicular to the longitudinal axis, of the drive shaft assembly 210. The angle θ is preferably between 3° and 10°.

An annular fillet 226 provides a smooth concave junction from the conical end face 224 of the collar portion 222 to the outer cylindrical surface of the annular end portion 220 of the yoke 14. The collar portion 222 also has a rounded outer edge 228 but the large chamfer or bevel 28 of the collar portion 22 is not necessary due to the conical end face 224 as explained below.

The hollow cylindrical end portion 216 of the torque tube 212 is press fit onto the annular end portion 220 of the yoke 214 to form a butt joint which is also characterized by a narrow annular slit 230 as shown in FIG. 5.

This narrow annular slit 230 has a gaugeable width W which is in the range of 0.045 to 0.055 inches. The actual width, however, is slightly greater and maximum at the outer end of the collar portion 222 due to the conical end face 224.

After the torque tube 212 is press fit into the yoke 214 to establish the narrow annular slit 30, an arc is established between the consumable electrode 34 shown in FIG. 2 and the assembly shown in FIG. 5.

The electrode 34 is preferably configured as a round wire having an outer diameter that is in the range of 0.045 to 0.055 inches to match the gaugeable width W of the narrow slit 230. This electrode 34 is also preferably aimed at the longitudinal axis of the assembly 210 so that the centerline of the round wire electrode 34 bisects the gaugeable width W of the narrow annular slit 230. However, the electrode need not be aligned with the narrow slit 230 precisely because the divergence of the conical face 224 of the yoke collar portion 222 away from the end face 218 of the torque tube 212 accommodates a small misalignment in the longitudinal direction. The outer corner radius 223 of the torque tube 212 also enhances the accommodation of small misalignments in the longitudinal direction. However an outer chamfer or large outer corner radius is not required for the collar portion 222 because of the conical face 224.

Once the electrode 34 is aligned with the narrow annular slit 230 the yoke 214 can be welded to the torque tube 212 in a single pass using essentially the same parameters described above in connection with FIGS. 1, 2 and 3.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of welding aluminum drive shaft components comprising the steps of:

providing a torque tube having a hollow cylindrical end portion, providing a yoke having an annular end portion, pressing the hollow cylindrical end portion of the torque tube onto the annular end portion of the yoke to provide an assembly having a narrow annular slit, positioning a consumable aluminum based electrode adjacent the narrow annular slit, forming an electric arc between the consumable aluminum based electrode and the assembly at the narrow annular slit, sustaining the electric arc with a pulsed high amperage direct current, and filling the narrow annular slit with aluminum based material from the consumable electrode in a single pass around the narrow annular slit to form a circumferential weld bead.

2. The method as defined in claim 1 wherein the end portion of the torque tube has a uniform wall thickness in the range of about 0.060 to 0.250 inches.

3. The method as defined in claim 2 wherein the narrow annular slit has a gaugeable width in the range of about 0.045 to 0.055 inches.

4. The method as defined in claim 3 wherein the consumable electrode is a wire having an outer diameter in the range of about 0.045 to 0.055 inches.

5. The method as defined in claim 1 wherein the narrow annular slit has a gaugeable width in the range of 0.045 to 0.055 inches.

6. The method as defined in claim 5 wherein the consumable electrode is a round wire having an outer diameter substantially equal to the gaugeable width of the narrow annular slit.

7. The method as defined in claim 1 wherein the electric arc is sustained with a pulsed high amperage electric current pulsed at a frequency of 100 to 200 cycles per second while maintaining an average current of at least 100 amps.

8. A method of welding aluminum drive shaft components comprising the steps of:

providing a torque tube having a hollow cylindrical end portion of uniform wall thickness that terminates in an annular end wall, providing a yoke having an annular collar and an annular end portion that protrudes from the annular collar, pressing the hollow cylindrical end portion of the torque tube onto the annular end portion of the yoke to provide an assembly having a narrow annular slit between the annular collar and the end wall of the torque tube, positioning a consumable aluminum based electrode adjacent the narrow annular slit, forming an electric arc between the consumable aluminum based electrode and the assembly at the narrow annular slit, sustaining the electric arc with a pulsed high amperage direct current, and filling the narrow annular slit with aluminum based material from the consumable electrode in a single pass around the narrow annular slit to form a circumferential weld bead.

9. The method as defined in claim 8 wherein the end portion of the torque tube has a uniform wall thickness in the range of about 0.060 to 0.250 inches and the narrow annular slit has a gaugeable width in the range of about 0.045 to 0.055 inches.

10. The method as defined in claim 9 wherein the consumable electrode is a round wire having a diameter substantially equal to the gaugeable width of the narrow annular slit.

11. The method as defined in claim 8 wherein the electric arc is sustained with a pulsed high amperage electric current pulsed at a frequency of 100 to 200 cycles per second while maintaining an average current of at least 100 amps.

12. The method as defined in claim 8 wherein the annular end wall of the torque tube has inner and outer chamfer-like surfaces.

13. The method as defined in claim 8 wherein the annular end wall of the torque tube has a flat mid-section, an inner corner radius and an outer chamfer.

14. The method as defined in claim 8 wherein the collar portion of the yoke has a flat annular end face at one side of the slit.

15. The method as defined in claim 8 wherein the collar portion of the yoke has a conical end face at none side of the slit.

* * * * *